W. E. WORTHEN.
STEAM PUMPING MACHINERY.
No. 10,255. Reissued Dec. 5, 1882.
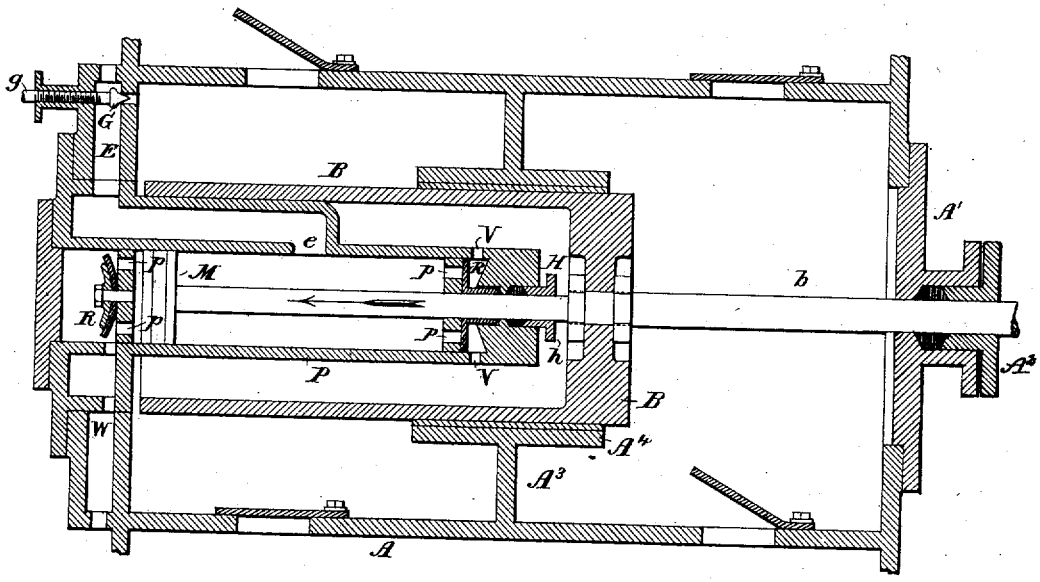
Wm. E. Worthen
Inventor:
By Chas. E. Foster
his attorney
Attest:
Courtney A. Cooper
A. E. Hansmann.
N. PETERS, Photo-Lithographer, Washington, D. C.

UNITED STATES PATENT OFFICE.

WILLIAM E. WORTHEN, OF NEW YORK, N. Y.

STEAM PUMPING MACHINERY.

SPECIFICATION forming part of Reissued Letters Patent No. 10,255, dated December 5, 1882.

Original No. 192,042, dated June 12, 1877. Application for reissue filed October 4, 1882.

*To all whom it may concern:*

Be it known that I, WILLIAM E. WORTHEN, of New York, in the county of New York and State of New York, have invented certain new and useful Improvements in Steam Pumping Machinery; and I do hereby declare the following is a full, clear, and exact description of the invention, that will enable others skilled in the art to which it appertains to make and use the same, reference being had to the accompanying drawing, and to the letters of reference marked thereon, which form a part of this specification.

My improvement relates to the air-pump by which a vacuum is produced and maintained in the condensing-chamber, and to the relation of this important member to the main pump.

I have devised a plan of construction by which the air-pump is worked in by an unusually direct connection to the main pump and in close contact with the main pump and partially within it. The cooling influence of the mass of water pumped is felt through a single thickness of metal to keep the temperature of the air-pump low, and a small quantity of injection-water suffices. My invention avoids the necessity for a foot-valve, and maintains an excellent vacuum.

The following is a description of what I consider the best means of carrying out the invention.

The accompanying drawing forms a part of this specification, and represents a vertical section through a horizontal pump constructed according to my invention.

Similar letters of reference indicate like parts in all the figures.

A is the main body of the pump, formed of cast-iron or other suitable material, and provided with a removable head, $A'$, and stuffing-box $A^2$, through which latter works the plunger-rod *b*, operated by connection to a steam-piston, (not represented,) and giving a powerful reciprocating motion to the large hollow plunger B, which works through a suitable bearing, $A^4$, in the diaphragm $A^3$. There may be packing within the bearing $A^4$, and the working of the plunger B through this packing produces the ordinary effect in alternately enlarging and contracting the capacity of the chambers each side of the diaphragm $A^3$, the water being inducted and educted therefrom as the chambers are enlarged and diminished by moving through valves.

So far as yet described, the machine and its mode of working are of an ordinary and long-approved construction.

A relatively small piston, M, is worked within the plunger B. It is directly connected by the rod *b*. This piston M is inclosed within a smoothly-bored cylinder, P, which constitutes a part of the fixed work of the machine, and serves as a double-acting air-pump. It receives the exhaust-steam, with its accompanying water and air, through a port, *e*, at the center of its length on the upper side. It expels the water and air through ports at each end, covered by self-acting valves opening outward into passages which connect with the water in the interior of the main pump, or with the water in its passage to the main pump.

The ports and valves at each end of the air-pump may be alike, except that one end has the rod *b* traversing through it, and may be guarded by a suitable stuffing-box. Furthermore, that end, which is thus conditioned, being held in the center of the main pump, may be kept colder, and delivers its water through shorter passages. We may use the same letters of reference for the two ends as far as they agree, *p* being used for the ports and R for the valves which cover them.

The steam which operates the main pump, after doing its work in the cylinder, (not represented,) is led through a suitable pipe or passage into the channel E, which extends vertically down from the top of the main casing A till it reaches the exterior of the air-pump cylinder P. It thence extends along on the top of the air-cylinder P to the port *e*.

G is a valve operated by a stem, *g*, and controlled by screw-threads or suitable adjustable means outside, (not represented,) which allows a discharge of a more or less stream of water from the body of the pump into this steam-channel. The channels surrounded by the cold water, with the injecting-port, constitute a condenser in which the exhaust-steam is condensed by the cold water, and also by contact with the large amount of cold surface to which it is exposed in the passage E and within the air-pump cylinder P. Any water which leaks backward through the ports *p* past the valves R, or which leaks into the air-pump cylinder P by passing any imperfect packing in the stuffing-box, will be utilized as so much addition to the injection-water, and when such leaking is liberal, may be compensated for by partially closing the valve G, which admits the controllable injection-water.

H is the stuffing-box, which surrounds the rod *b*. It is adjusted by a gland, *h*. It should be prepared with more regard to durability than to tightness. The disposition of the small quantity of steam remaining uncondensed, and of the small quantity of air which usually obtains in the thin gaseous matter worked by the air-pump of a low-pressure steam-engine, is much the same with my machine as with others. The gaseous matter is compressed and forced out with the water of injection and the water of condensation at each movement of the piston M; but the action is peculiar, inasmuch as there is no foot-valve or any equivalent therefor. When the piston M moves to either end of its stroke it compresses the thin gaseous matter and drives it and the water before it out through the ports *p*. When the piston M returns its movement from the end to the center is ineffective except to produce a good vacuum behind it. For a very brief period, at exactly mid-stroke, the piston M entirely covers the receiving-port *e;* but another moment it uncovers the receiving-port *e*, and the contents of the channel E rush into the vacuum behind the piston M, which, by the continued movement of the piston M, receives all it can get until the return of the piston M again covers the port *e* and compresses the material in advance of it and forces it out through the ports *p*. This operation obtains at each end, and is repeated as long as the machinery is worked, maintaining a good vacuum in the condensing-channel E and the exhaust end of the steam-cylinder. (Not represented.) The water and air thus forced out through the ports *p* past the valves R mingle with the water which is being pumped. From the one end they flow through the short ports V directly into the mass of water in one end of the main pump B. From the other they flow out through the more lengthy passage W, which is carefully isolated from the pump and communicates with the inflowing water-passage. (Not represented.) The condensed water is thus discharged under little resistance at either end. At one end it is discharged into the suction-passage of the main pump. At the other end it is discharged into a part of the main pump which is at that time under suction. My construction allows extraordinary freedom for the water of condensation from the condenser to fall into the air-pump, and for the uncondensed steam and gaseous matter to be received with it, there being absolutely no valve to pass on the way between the exhaust-pipe of the engine and the port *e*. The movement of the piston M prepares an unusually strong vacuum at one period to receive these products, and under any ordinary conditions will maintain in the closed condensing-chamber a good vacuum of great uniformity. The directness of the connection of the piston M to the main plunger and the freedom of the induction and eduction of the water allow the pump to be worked with unusual rapidity.

I claim as my invention—

1. The air-pump P M, mounted within the main casing A, and the main plunger B, operated by a direct connection, *b*, as herein specified.

2. The main casing, exhaust-passage E, central port, *e*, communicating with the condenser, delivery-passages *p*, and air-pump piston M, operated from a steam-piston, all combined and arranged for joint operation in a steam pumping-machine, as herein specified.

3. The combination, in an air-pump, of a cylinder having exhaust-ports and valves, a reciprocating piston, and a central inlet-port communicating with a closed condensing-chamber, all constructed and arranged to maintain a nearly-uniform vacuum in the condensing-chamber without the interposition of a foot-valve, as described.

4. The combination, with a receptacle for exhaust-steam in which a vacuum is maintained, of a pump having outlet-ports and valves, and a port communicating with the condensing-chamber and arranged centrally to be uncovered by the piston to put the condensing chamber and cylinder into direct communication as the piston approaches the end of its stroke, as set forth.

In testimony whereof I have affixed my signature in presence of two witnesses.

WILLIAM E. WORTHEN.

Witnesses:
THOS. D. WHISTLER,
ALBERT N. CONNETT.